(12) United States Patent
Clary

(10) Patent No.: US 7,554,237 B2
(45) Date of Patent: Jun. 30, 2009

(54) CENTRIFUGAL-EFFECT VIBRATION GENERATOR HAVING COAXIAL CONTRAROTATING ROTORS

(75) Inventor: Sylvain Clary, Pau (FR)

(73) Assignee: Eurocopter, Marignane (FR)

( * ) Notice: Subject to any disclaimer, the term of this patent is extended or adjusted under 35 U.S.C. 154(b) by 377 days.

(21) Appl. No.: 11/439,115

(22) Filed: May 24, 2006

(65) Prior Publication Data

US 2006/0266153 A1   Nov. 30, 2006

(30) Foreign Application Priority Data

May 25, 2005   (FR) .................................. 05 05223

(51) Int. Cl.
  *B06B 1/16*  (2006.01)
  *B06B 1/04*  (2006.01)
  *F16F 15/18*  (2006.01)
  *H02K 7/065*  (2006.01)
  *H02K 16/00*  (2006.01)
(52) U.S. Cl. ........................... 310/114; 310/74; 310/81; 310/115; 74/61; 74/87; 244/165
(58) Field of Classification Search ................ 310/81, 310/114, 74, 51; 74/61, 86–87; 209/367; 244/165
See application file for complete search history.

(56) References Cited

U.S. PATENT DOCUMENTS

| | | | | |
|---|---|---|---|---|
| 3,091,712 | A | * | 5/1963 | Galbraith ..................... 310/81 |
| 4,211,121 | A | * | 7/1980 | Brown ........................... 74/87 |
| 4,561,319 | A | | 12/1985 | Lilja |
| 5,005,439 | A | | 4/1991 | Jensen et al. |
| 6,504,278 | B1 | * | 1/2003 | Bald et al. .................... 310/81 |
| 2005/0067908 | A1 | * | 3/2005 | Nai et al. .................... 310/112 |

FOREIGN PATENT DOCUMENTS

| | | | |
|---|---|---|---|
| DE | 1950562 | * | 9/1996 |
| DE | 10135015 | * | 2/2003 |
| EP | 0409462 A1 | | 1/1991 |
| FR | 2659574 | * | 9/1991 |
| FR | 2852648 | | 3/2003 |
| GB | 2226866 | * | 11/1990 |
| JP | 07-289993 | * | 11/1995 |
| SU | 1526844 | | 12/1989 |
| WO | 88/06687 A | | 9/1988 |

* cited by examiner

*Primary Examiner*—Burton Mullins
(74) *Attorney, Agent, or Firm*—Young & Thompson

(57) ABSTRACT

A device for generating forces that are variable and controllable in amplitude, in direction, and in frequency, the device includes two unbalanced rotors (18, 20, 35 to 38) mounted coaxially in a casing (11). The device further includes electromagnetic drive elements for driving a first of the two rotors in rotation relative to the second of the two rotors, and brake elements (43 to 45) for braking the second rotor (20, 36, 38) relative to the casing.

20 Claims, 4 Drawing Sheets

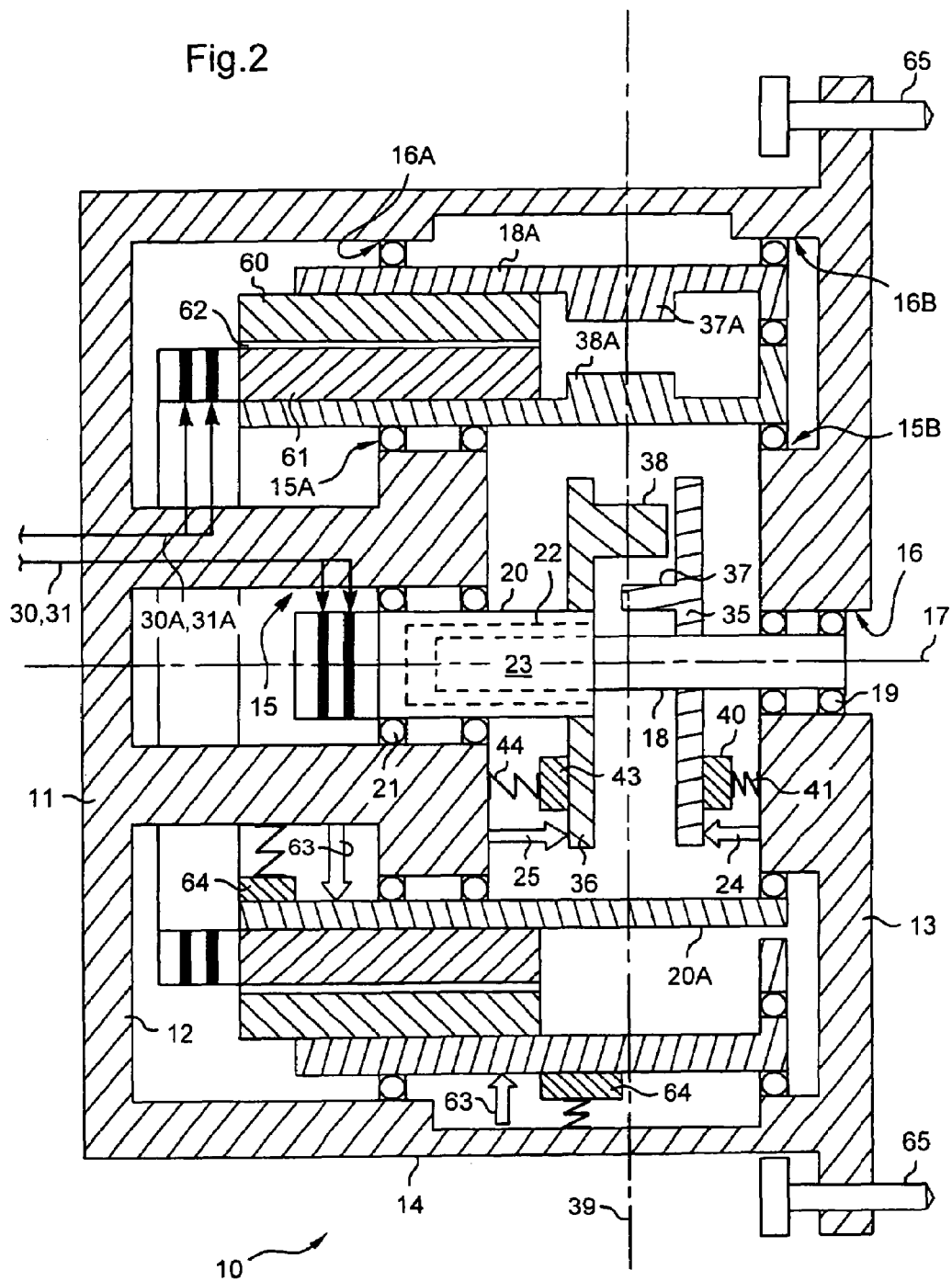

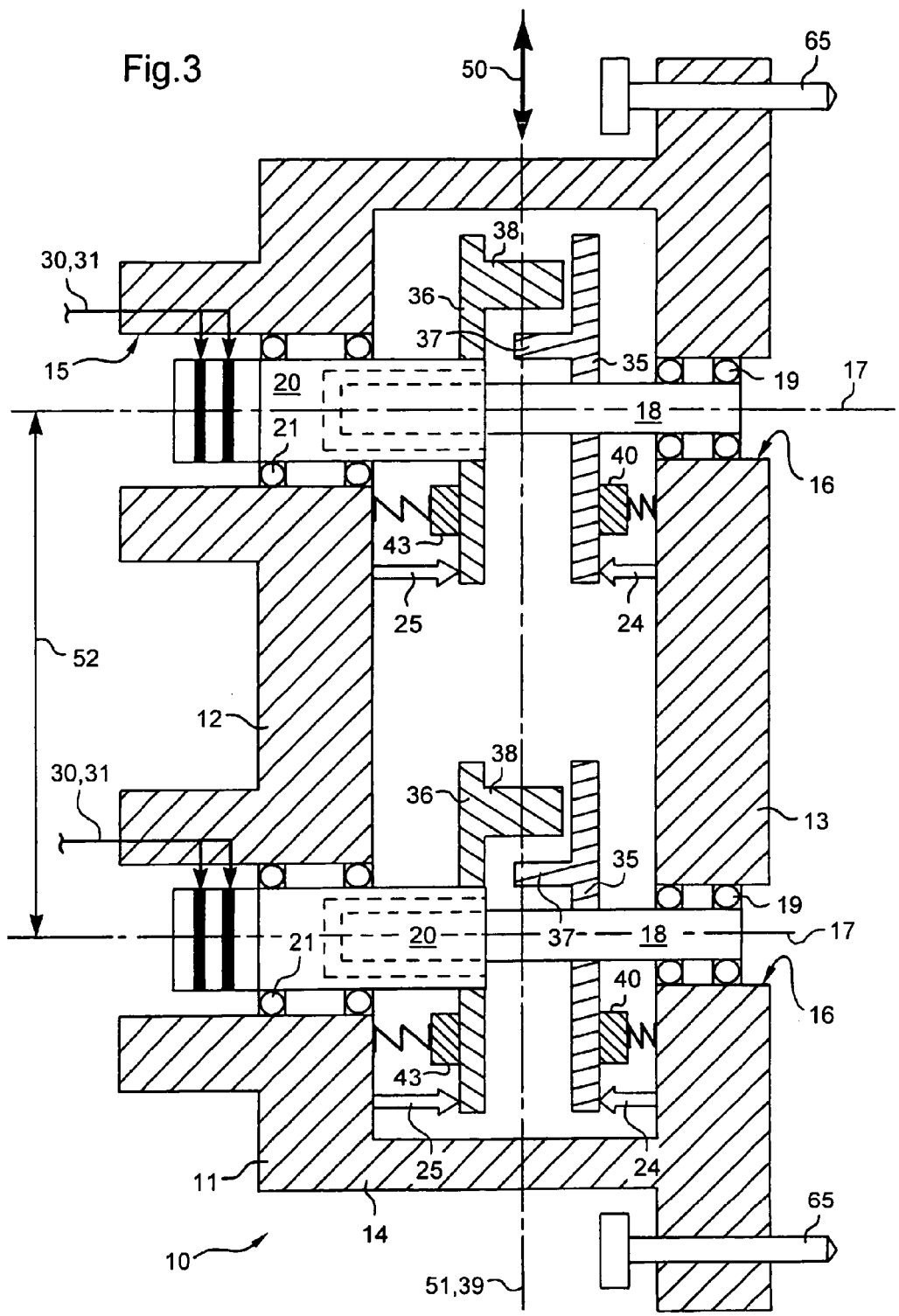

CENTRIFUGAL-EFFECT VIBRATION GENERATOR HAVING COAXIAL CONTRAROTATING ROTORS

The present invention relates to a centrifugal-effect vibration generator comprising a plurality of coaxial and contrarotating rotors.

The technical field of the invention is that of actively attenuating vibration on board helicopters and other rotary wing aircraft.

BACKGROUND OF THE INVENTION

It is known to fit such aircraft with actuators for eliminating or attenuating the aircraft vibration that results in particular from the alternating forces applied to the fuselage by the mechanism that provides the aircraft with lift and propulsion.

To this end, aircraft vibration is measured using at least one accelerometer delivering a vibration measurement signal, the measurement signal is processed by processor means including an algorithm recorded in an electronic card or in an on-board computer, so as to obtain a control signal that is applied to an actuator in order to generate forces that oppose the measured vibration.

The forces may result from the reciprocating movement of a mass mounted to move in translation relative to the structure of the aircraft. The mass is generally connected to the structure of the aircraft by a spring and is driven by a linear electromagnetic actuator; that type of antivibration actuator presents several drawbacks, and in particular:

i) poor efficiency which leads to high consumption of electricity, and also requires a powerful amplifier to be used on the control signal;

ii) the amplifier and the actuator present high mass; and iii) the transfer function is not linear with control signal frequency, said transfer function presenting a peak at a resonant frequency.

It is also known to use a rotary actuator comprising unbalanced rotors (having unbalance weights) for producing forces by the centrifugal effect.

European patent EP 0 409 462 and U.S. Pat. No. 5,005,439 disclose a generator of inertial forces for canceling undesired vibration of an engine; the generator comprises a casing containing two pairs of unbalanced rotors presenting a common axis of rotation; each rotor in each pair of rotors is driven in rotation (inside the casing) by a respective variable speed motor; each pair of rotors comprises an outer rotor and an inner rotor that extends (in part) inside the outer rotor; the two rotors in a first pair of rotors are driven in a first direction of rotation, and the two rotors in the second pair of rotors are driven in a second direction of rotation opposite from the first direction of rotation; the four rotors present an unbalance weight (or eccentric mass) that is identical, and implemented in the form of a cylindrical shell or a sector of a plate; the frequency of the centrifugal inertial force of the generator is modified by varying the (common) speed of rotation of the rotors; the amplitude of the inertial force for each pair of rotors is modified by varying the angular offset between the unbalance weights of the rotors in the pair of rotors in question; the direction of the centrifugal inertial force of the generator is controlled by controlling the phase difference between the two pairs of rotors.

Adjusting those operating parameters requires the relative angular position of each rotor to be measured and adjusted continuously.

The unbalance weights of the four rotors are either centered in a plane that is orthogonal to the common axis of rotation when the rotors form "interleaved" shells, or else they are disposed on either side of and at a short distance from said plane, when juxtaposed plates and/or sectors are used.

Such a generator is also heavy and bulky.

OBJECTS AND SUMMARY OF THE INVENTION

An object of the invention is to propose a force generator that is controllable in amplitude, in frequency, and preferably in direction, that is improved and/or that remedies, at least in part, the drawbacks of vibration generators (or "suppressors") for aircraft.

The invention provides a device for generating forces that are variable and controllable in amplitude, possibly in direction, and in frequency, the device comprising two rotors mounted to be coaxial and to rotate in opposite directions in a casing, each rotor including an unbalance weight (for generating said forces by the centrifugal effect); the device further includes electromagnetic drive means for driving a first of the two rotors in rotation from the second of the two rotors, and also brake means for braking the second rotor relative to the casing.

In other words, and according to another aspect of the invention, an antivibration device is proposed that comprises two coaxial unbalanced rotors mounted in a casing, a first of the two rotors including an (electro) magnetic first circuit and a second of the two rotors including an electromagnetic second circuit designed and arranged to co-operate with the (electro) magnetic first circuit and to drive the first rotor in rotation relative to the second rotor and about the common axis of the rotors whenever the electromagnetic second circuit is powered; the device further comprises second-rotor brake means for braking the rotation of the second rotor relative to the casing, and brake control means for controlling the speed and the phase of the rotation of the second rotor (relative to the casing); the device also includes drive control means for controlling the speed and the phase of rotation of the first rotor relative to the second rotor and/or relative to the casing.

The device of the invention operates as follows: when the electromagnetic circuit of the second rotor is powered, it forms a rotating magnetic field; the (electro) magnetic circuit of the first rotor and placed in the rotating field is driven, together with the first rotor, in rotation by said field relative to the second rotor; thus, the two rotors and their associated magnetic circuits form an electric motor in which the "stator" is itself mounted to rotate about the axis of the motor inside the casing of the device.

In reaction to the drive torque exerted by the second rotor on the first rotor, the second rotor is subjected to an opposite torque that causes it to rotate relative to the casing in a direction opposite to the direction of rotation of the first rotor; on the basis of a measurement of the angle (the phase) and the speed of rotation of each of said rotors, both the means for driving the first rotor from the second rotor and the means for braking the second rotor relative to means secured to the casing are controlled in order to maintain a "slip" speed for the second rotor (relative to the casing) of absolute magnitude that is equal to the (driving) "slip" speed of the first rotor relative to the casing.

The invention makes it possible to use a single motor for driving both rotors, thereby enabling the weight and/or the bulk of the mechanical and electromechanical components of the device to be decreased.

In a preferred embodiment of the invention, the antivibration device has two such subassemblies that are substantially identical and in alignment on a common axis of rotation, and the device includes means for measuring and controlling the phase difference between the two pairs of contrarotating rotors so as to adapt the amplitude of the centrifugal forces generated by the device.

In another embodiment of the invention, the antivibration device incorporates two such subassemblies that are substantially identical, the two pairs of rotors being in alignment on two distinct axis of rotation that are parallel to each other, and the device includes means for measuring and controlling the phase difference between the two pairs of contrarotating rotors.

According to another preferred characteristic, the magnetic circuit (primary magnetic circuit) of the second rotor is powered with direct current (DC) via slip rings; under such circumstances, the first rotor may have a magnetic circuit based on permanent magnets, or an electromagnetic circuit connected to an electrical power supply via slip rings.

BRIEF DESCRIPTION OF THE DRAWINGS

Other characteristics and advantages of the invention appear from the following description which refers to the accompanying drawings which show preferred embodiments of the invention with no limiting character.

FIG. 2 is a diagrammatic section view on a plane containing the common axis of rotation of four unbalanced rotors, showing a vibrator or device constituting a second embodiment of the invention, for generating a force with frequency, amplitude, and direction that are adjustable independently of one another.

FIG. 3 is a diagrammatic section view on a plane containing the two respective axes of rotation of two pairs of unbalanced rotors, showing a vibrator or device constituting a third embodiment of the invention, for generating a force of frequency and amplitude that are independently adjustable, the direction of the force depending on the relative position of the two axes of rotation.

MORE DETAILED DESCRIPTION

Figure 1:
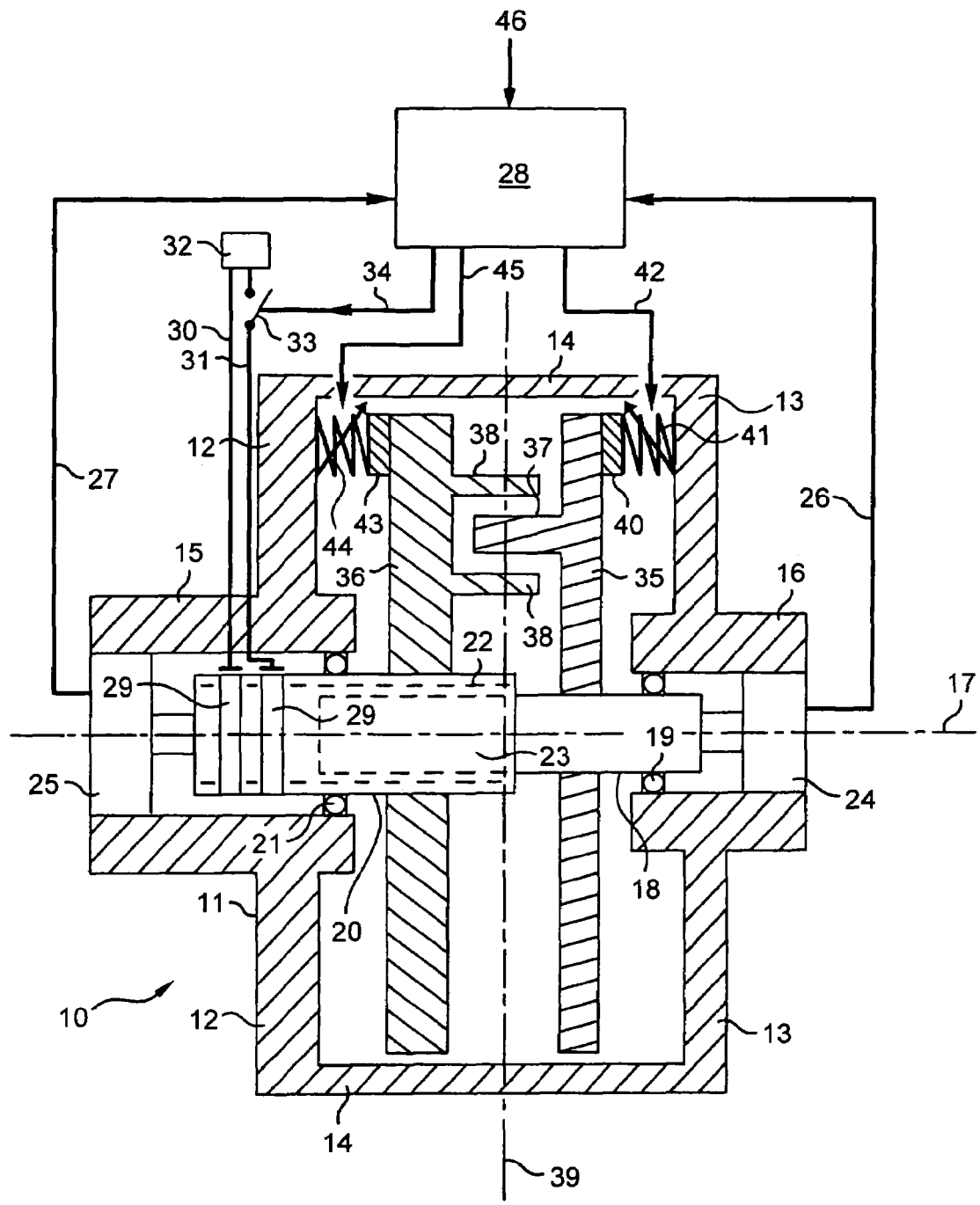
FIG. 1 is a diagrammatic section view on a plane containing the common axis of rotation of the two unbalanced rotors, showing a vibrator or device constituting a first embodiment of the invention, for generating a force at a frequency and in a direction that are independently adjustable, the amplitude of the force depending on the frequency of rotation.

With reference to FIGS. 1 to 3, the device 10 comprises a casing 11 having two end plates 12 and 13 facing each other and united by a shell 14.

Each end plate 12, 13 has a respective bearing 15, 16; these two bearings lie on an axis 17.

A first rotor 18 is rotatably mounted in the casing on the axis 17 relative to the bearing 16 via bearing balls 19 or other equivalent means.

A second rotor 20 is rotatably mounted in the casing 11 on the axis 17 relative to the bearing 15 via bearing balls 21 or equivalent means.

The second rotor 20 presents a longitudinal cavity 22 having a portion 23 of the rotor 18 extending therein.

The second rotor 20 has an electromagnetic circuit suitable for producing an electromagnetic field rotating about the axis 17 inside the cavity 22.

The first rotor 18 has a magnetic circuit extending at least in part in its portion 23 and suitable for being driven in rotation about the axis 17 by the rotary field produced in the cavity 22.

The device includes a first sensor 24 for measuring the angular position and/or the speed of rotation of the first rotor 18, and a second sensor 25 for measuring the angular position and/or the speed of rotation of the second rotor 20.

With reference to FIG. 1 in particular, these two sensors are connected via respective links 26 and 27 to an electronic signal and data processor unit 28, to which each of them delivers a signal or data representative of the angular position or the instantaneous speed of the rotor (18 or 20, respectively).

With reference to FIGS. 1 to 3, the rotor 20 includes slip rings 29, and the device includes conductors 30 and 31 for feeding the slip rings from an electrical power supply 32; this serves to power the electromagnetic circuit of the second rotor 20.

This power supply is controlled by the unit 28 acting for this purpose on a power supply control member 33 via a conductor 34 for conveying signals for controlling the power supply to the electromagnetic circuit of the rotor 20 (cf. FIG. 1).

Each of these two rotors 18, 20 includes a respective flywheel 35, 36 possibly being in the form of a disk about the axis 17; each of these two disks includes a respective unbalance weight 37, 38.

These two disks and their respective eccentric masses 37, 38 extend in the immediate vicinity of a plane orthogonal to the axis 17 intersecting the plane of FIG. 1 on a chain-dotted trace 39; this plane is the plane in which the forces generated by the device act.

A first brake serves to slow down rotation of the first rotor 18 within the casing; this brake comprises a shoe 40 suitable for rubbing against the periphery of the disk 35 when it is displaced by an actuator 41 under the control of braking control signals generated by the unit 28 and transmitted to the actuator by a conductor 42 (cf. FIG. 1).

In the same manner, a second brake serves to slow down rotation of the second rotor 20; this brake comprises a shoe 43 suitable for rubbing against the periphery of the disk 36 secured to the rotor 20 under drive from an actuator 44 controlled by signals conveyed by a conductor 45.

In operation, the electronic unit 28 receives a setpoint 46 for the force to be generated at determined frequency, amplitude, and direction; as a function of the signals/data received from the sensors 24 and 25, the unit 28 generates control signals that it delivers respectively via the conductors 34, 45, and 42; these signals serve to continuously adjust the magnetic field enabling the rotor 18 to be driven by the rotor 20, and also the braking force applied to each of these two rotors (cf. FIG. 1).

In particular, the absolute value of the speed of rotation of each of the two (or four) rotors is kept equal by servo-controlling the two (or four) brakes.

In practice, the first-order static moment of the rotors is similar or identical.

With reference to FIGS. 2 and 3, the device of the invention comprises two assemblies of the kind shown in FIG. 1, giving four rotors each having a flyweight, the rotors presenting identical inertia (or static moments) and the flyweights extending substantially in the plane (referenced 39) containing the direction of the forces to be generated.

Figure 5:
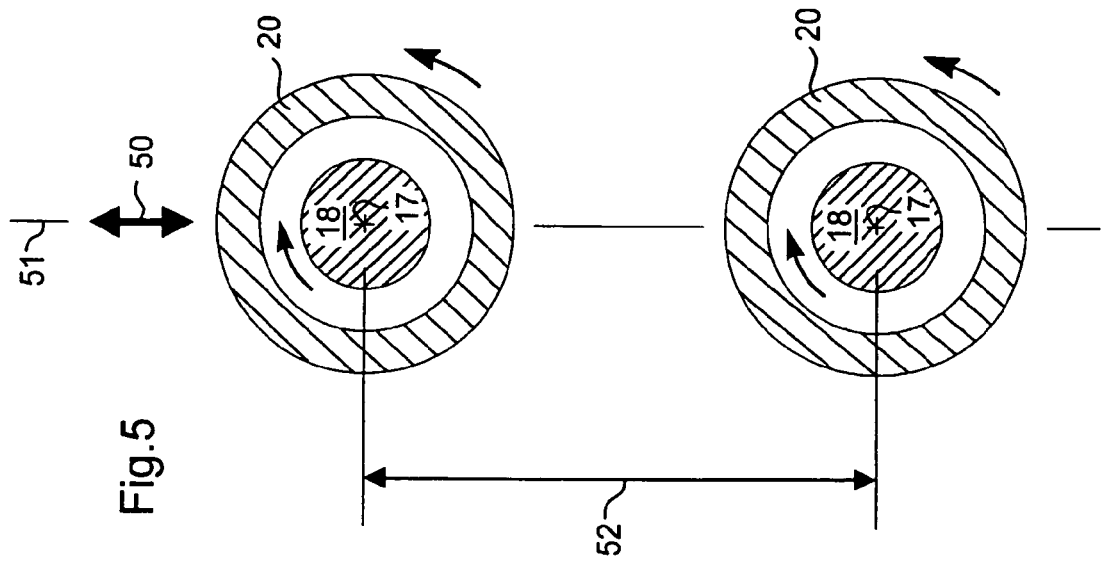
FIG. 5 is a diagrammatic section view on a plane perpendicular to the axis of rotation of the unbalanced rotors, showing the relative position and the directions of rotation of the rotors of the vibrator or device constituting the third embodiment of the invention.

In the third embodiment corresponding to FIGS. 3 and 5, the direction 50 of the alternating force generated by the device is stationary: it is colinear with the axis 51 tracing the plane 39 that is perpendicular to the axes of rotation 17, this axis 51 intersecting both axes of rotation 17.

In this embodiment, the device has two assemblies identical to that shown in FIG. 1, with axes of rotation 17 that are parallel and spaced apart by a distance 52; the two pairs of contrarotating and coaxial unbalanced rotors are mounted in a common casing 11 to 14.

In the first two embodiments (FIGS. 1, 2, and 4), the direction of the overall force generated by the unbalanced rotors is controlled by the contrarotating movement of each pair of flyweights. This corresponds to controlling the slip speed between the rotor 18 and the rotary "stator" 20 of each pair of rotors in the drive system, so as to ensure that the flyweights 37 and 38 rotate in opposite directions. This control can be performed by a differential braking system for the "stator" 20 and the rotor 18 in each pair of rotors.

This servo-control also applies to the phase between the two flyweights in a given pair of rotors 18, 20 so as to maintain rotary movement in opposite direction between the flyweights. The direction (reference 50 or 54, FIG. 4) of the force generated is defined by the two points where the flyweights cross ("high" and "low" cross-points), and it is therefore controlled by the phase difference between the flyweights.

The unbalance weights must be as close as possible to said plane 39, and they may optionally be concentric, so as to limit or even eliminate the parasitic torque created on the drive system.

Figure 4:
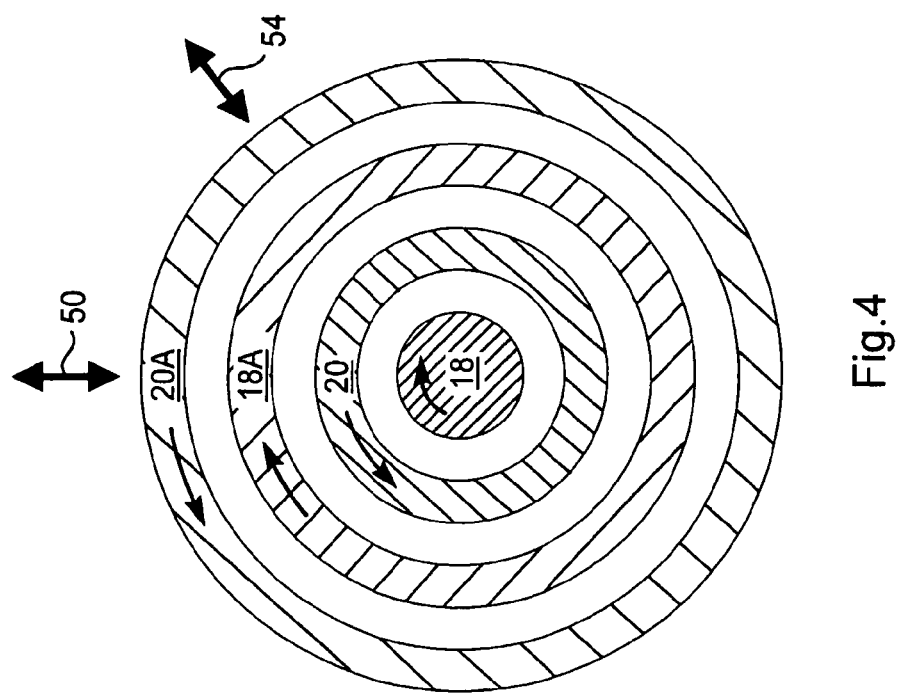
FIG. 4 is a diagrammatic section view on a plane perpendicular to the axes of rotation of the unbalanced rotors, showing the relative position and the directions of rotation of the rotors of the vibrator or device constituting the second embodiment of the invention; except where stated otherwise, the references including a final letter ("A" or "B") designate elements or members of structure or function that are identical or similar to elements or members designated by the same reference but without a final letter.

In the second embodiment of FIGS. 2 and 4, the device has a second pair of contrarotating rotors on the axis of rotation 17 of the first pair of rotors: a "driven" third rotor 18A and a "driving" fourth rotor 20A are mounted in the casing via respective bearings 16A, 16B and 15A, 15B.

The rotors 18A, 20A are in the form of cylinders or drums about the axis 17; the rotor 18A includes a magnetic circuit 60 while the rotor 20A carries an electromagnetic circuit 61 facing the circuit 60 and separated therefrom by an airgap 62; the circuit 61 is connected to a power supply (not shown) via slip rings and conductors 30A, 31A.

These rotors are fitted with respective unbalance weights 37A, 38A; a rotation sensor 63 and a brake 64 are associated with each of the rotors 18A, 20A and are used as described above to control the speed and the phase of each of the rotors at all times.

With reference to FIGS. 2 and 4, screws 65 are provided for securing the apparatus 10 to a support (not shown) that is to be caused to vibrate.

In a device having two coaxial pairs as shown in FIGS. 2 and 4, the amplitude of the total force generated is controlled by controlling the phase between the two pairs of contrarotating flyweights secured respectively to the two pairs of rotors. This phase control is performed by modifying the frequency of rotation of one "motor" (i.e. a pair of rotors 18, 20) so as obtain the desired phase; thereafter the frequencies of rotation are caused to be identical for all four rotors (ignoring sign).

This servo-control thus acts on the phase between the flyweights of the two pairs of rotors.

The frequency of the force generated is controlled directly by the speed of rotation of the two "motors".

The flyweights should be of a form such that the polar inertias of the (flyweights+stator) and (flyweight+rotor) assemblies are as close as possible.

The braking device is used for controlling the movement of each rotor, in particular by compensating:
the friction differences between the two bearings (given references 19 and 21); and
the residual difference between the polar inertias of the rotary assemblies.

Braking is thus used only for making small corrections to torque.

For the braking device, various solutions can be envisaged, and in particular:
braking by mechanical friction (like a disk brake): under such circumstances, the brake may be mounted either facing a peripheral portion of the rotor carrying a flyweight, for maximum efficiency, or facing a more central portion of the rotor and of the "stator" in order to limit the outside diameter and thus the overall bulk of the system; and/or
electromagnetic braking: in which case the braking is obtained by using electrical energy that can be stored (e.g. in a capacitor), and/or by using eddy currents.

What is claimed is:

1. A device (10) for generating forces that are variable and controllable in frequency and in amplitude, the device comprising:
two unbalanced rotors (18, 20, 35 to 38) mounted coaxially in a casing (11),
electromagnetic drive means for driving a first of the two rotors in rotation from the second of the two rotors such that the rotors rotate in opposite directions,
brake means (43 to 45) for braking the second rotor (20, 36, 38) relative to the casing,
means for controlling the speed of the rotors in order to maintain their absolute speeds substantially identical, and
unbalance weights or flyweights (37, 38) fitted to the rotors having the same static moment relative to the common axis of rotation and situated in or close to a common plane (39) that is orthogonal to one or both of the common axes of rotation (17) of the rotors.

2. A device according to claim 1, wherein,
a first of the two rotors has one of i) a magnetic and ii) an electromagnetic first circuit, and
a second of the two rotors has an electromagnetic second circuit to co-operate with the (electro) magnetic first circuit, and to drive the first rotor in rotation about the common axis (17) of the rotors relative to the second rotor when the electromagnetic second circuit is powered.

3. A device according to claim 1, further comprising control means (28) for controlling the brake means in order to control the speed of rotation and the phase of the second rotor relative to the casing.

4. A device according to claim 1, also comprising drive control means (33, 34) for controlling the speed of rotation and the phase of the first rotor (18, 35, 37) relative to the second rotor or relative to the casing.

5. A device according to claim 1, further comprising brake means (40 to 42) designed and arranged to brake the first rotor (18, 35, 37).

6. A device according to claim 1, in which the brake means operate by mechanical friction.

7. A device according to claim 1, in which the brake means operate by an electromagnetic effect.

8. A device according to claim 1, in which the second rotor includes a cavity (22) and an electromagnetic circuit for creating a magnetic field in the cavity, and in which the first rotor includes a portion (23) engaged with small clearance in the cavity (22) of the second rotor.

9. A device, (10) for generating forces that are variable and controllable in frequency and in amplitude, the device comprising:
   two unbalanced rotors (18, 20, 35 to 38) mounted coaxially in a casing (11),
   electromagnetic drive means for driving a first of the two rotors in rotation from the second of the two rotors such that the rotors rotate in opposite directions,
   brake means (43 to 45) for braking the second rotor (20, 36, 38) relative to the casing, means for controlling the speed of the rotors in order to maintain their absolute speeds substantially identical, and two pairs of contrarotating and coaxial rotors, each pair of rotors comprising a said first rotor and a said second rotor constituting a moving stator for the first rotor.

10. A device according to claim 9, having an axis of rotation (17) common to both pairs of rotors.

11. A device according to claim 9, having distinct axes of rotation (17) for each of the pairs of rotors.

12. A force generator device comprising two coaxial unbalanced rotors mounted in a casing, a first of the two rotors having a magnetic first circuit, and a second of the two rotors having an electromagnetic second circuit provided and arranged to co-operate with the magnetic first circuit and to drive the first rotor in rotation about the common axis of the rotors relative to the second rotor when the electromagnetic second circuit is powered, the device further comprising second-rotor brake means for braking the rotation of the second rotor relative to the casing, brake control means for controlling the speed and the phase of the rotation of the second rotor relative to the casing, and drive control means for controlling the speed and the phase of rotation of the first rotor relative to the second rotor or relative to the casing.

13. A device according to claim 12, further comprising brake means (40 to 42) designed and arranged to brake the first rotor (18, 35, 37).

14. A device according to claim 12, having two pairs of contrarotating and coaxial rotors, each pair of rotors comprising a said first rotor and a said second rotor constituting a moving stator for the first rotor.

15. A device according to claim 14, having an axis of rotation (17) common to both pairs of rotors.

16. A device according to claim 14, having distinct axes of rotation (17) for each of the pairs of rotors.

17. A device according to claim 12, in which unbalance weights or flyweights (37, 38) fitted to the rotors have the same static moment relative to the common axis of rotation and are situated in or close to a common plane (39) that is orthogonal to a common axis of rotation (17) of the rotors.

18. A device according to claim 12, in which the brake means operate by mechanical friction.

19. A device according to claim 12, in which the brake means operate by an electromagnetic effect.

20. A device according to claim 12, in which the second rotor includes a cavity (22) and an electromagnetic circuit for creating a magnetic field in the cavity, and in which the first rotor includes a portion (23) engaged with small clearance in the cavity (22) of the second rotor.

* * * * *